(12) United States Patent
Kajita et al.

(10) Patent No.: US 9,390,480 B2
(45) Date of Patent: Jul. 12, 2016

(54) DISPLAY APPARATUS WITH IMAGE-CAPTURING FUNCTION, IMAGE PROCESSING APPARATUS, IMAGE PROCESSING METHOD, AND IMAGE DISPLAY SYSTEM

(71) Applicant: CANON KABUSHIKI KAISHA, Tokyo (JP)

(72) Inventors: Yoshiki Kajita, Kawasaki (JP); Akihiro Katayama, Yokohama (JP); Shinji Uchiyama, Yokohama (JP); Masahiro Suzuki, Kawasaki (JP); Takuya Tsujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/590,849

(22) Filed: Jan. 6, 2015

(65) Prior Publication Data

US 2015/0116359 A1    Apr. 30, 2015

Related U.S. Application Data

(62) Division of application No. 11/751,772, filed on May 22, 2007, now Pat. No. 8,953,057.

(30) Foreign Application Priority Data

May 22, 2006  (JP) ................................. 2006-141621
Jan. 25, 2007  (JP) ................................. 2007-015064

(51) Int. Cl.
*G06T 5/00* (2006.01)
*G02B 27/01* (2006.01)
*G06T 19/00* (2011.01)
*G09G 5/36* (2006.01)

(52) U.S. Cl.
CPC .............. *G06T 5/002* (2013.01); *G02B 27/017* (2013.01); *G02B 27/0172* (2013.01); *G06T 5/006* (2013.01); *G06T 19/006* (2013.01); *G02B 2027/011* (2013.01); *G02B 2027/014* (2013.01); *G02B 2027/0138* (2013.01); *G09G 5/36* (2013.01); *G09G 2340/12* (2013.01)

(58) Field of Classification Search
USPC ....................................................... 348/230.1
See application file for complete search history.

(56) References Cited

U.S. PATENT DOCUMENTS

2005/0062897 A1*  3/2005  Lei ........................... H04N 5/20
                                                          348/806

* cited by examiner

*Primary Examiner* — Albert Cutler
(74) *Attorney, Agent, or Firm* — Canon USA, Inc. I.P. Division

(57) ABSTRACT

A display apparatus with an image-capturing function includes an outputting unit configured to output an image signal to an external apparatus, an inputting unit configured to input an image signal from the external apparatus, an image-capturing unit, a display unit, an image-capture-distortion corrector configured to perform image-capture-distortion correction on an image signal captured by the image-capturing unit, a display-distortion corrector configured to perform display-distortion correction, and a controller configured to control whether or not the image-capture-distortion corrector is to perform the image-capture-distortion correction, and whether or not the display-distortion corrector is to perform the display-distortion correction. Therefore, distortion caused by the image-capturing system and display system of the display apparatus with an image-capturing function can be appropriately corrected in the overall system including the display apparatus with an image-capturing function and the external apparatus.

1 Claim, 11 Drawing Sheets

FIG. 6

| SETTING | COMBINING | FIRST DISTORTION CORRECTOR | | | | SECOND DISTORTION CORRECTOR | | | |
|---|---|---|---|---|---|---|---|---|---|
| | | CAPTURE | CAPTURE /INVERSE | DISPLAY | CAPTURE + DISPLAY | CAPTURE | CAPTURE /INVERSE | DISPLAY | CAPTURE + DISPLAY |
| 1 | NOT APPLICABLE | — | — | — | — | — | — | — | — |
| 2 | | CAPTURED | — | — | — | — | — | — | — |
| 3 | | CAPTURED | — | — | — | — | — | CAPTURED | — |
| 4 | | — | — | CAPTURED | — | — | — | — | — |
| 5 | | — | — | — | CAPTURED | — | — | — | — |
| 6 | HMD | CAPTURED | — | — | — | — | — | COMBINED | — |
| 7 | | — | — | — | CAPTURED | — | — | — | — |
| 8 | | CAPTURED | — | — | — | — | EXTERNAL | — | — |
| 9 | | COMBINED | — | — | — | — | EXTERNAL | — | — |
| 10 | | — | — | COMBINED | — | — | — | — | — |
| 11 | | — | — | CAPTURED | — | — | — | — | — |
| 12 | | — | — | — | CAPTURED | — | — | — | — |
| 13 | EXTERNAL APPARATUS | CAPTURED | — | — | — | — | — | — | — |
| 14 | | — | — | — | CAPTURED | — | — | EXTERNAL | — |
| 15 | | — | — | EXTERNAL | — | EXTERNAL | — | — | — |
| 16 | | — | — | — | — | EXTERNAL | — | — | — |
| 17 | | — | — | — | — | — | — | — | EXTERNAL |
| 18 | | — | — | — | — | — | — | — | — |
| 19 | | CAPTURED | — | — | — | — | — | — | — |
| 20 | | — | — | — | — | — | — | EXTERNAL | — |
| 21 | | — | — | — | — | — | — | EXTERNAL | — |
| 22 | | — | — | — | — | — | — | — | — |

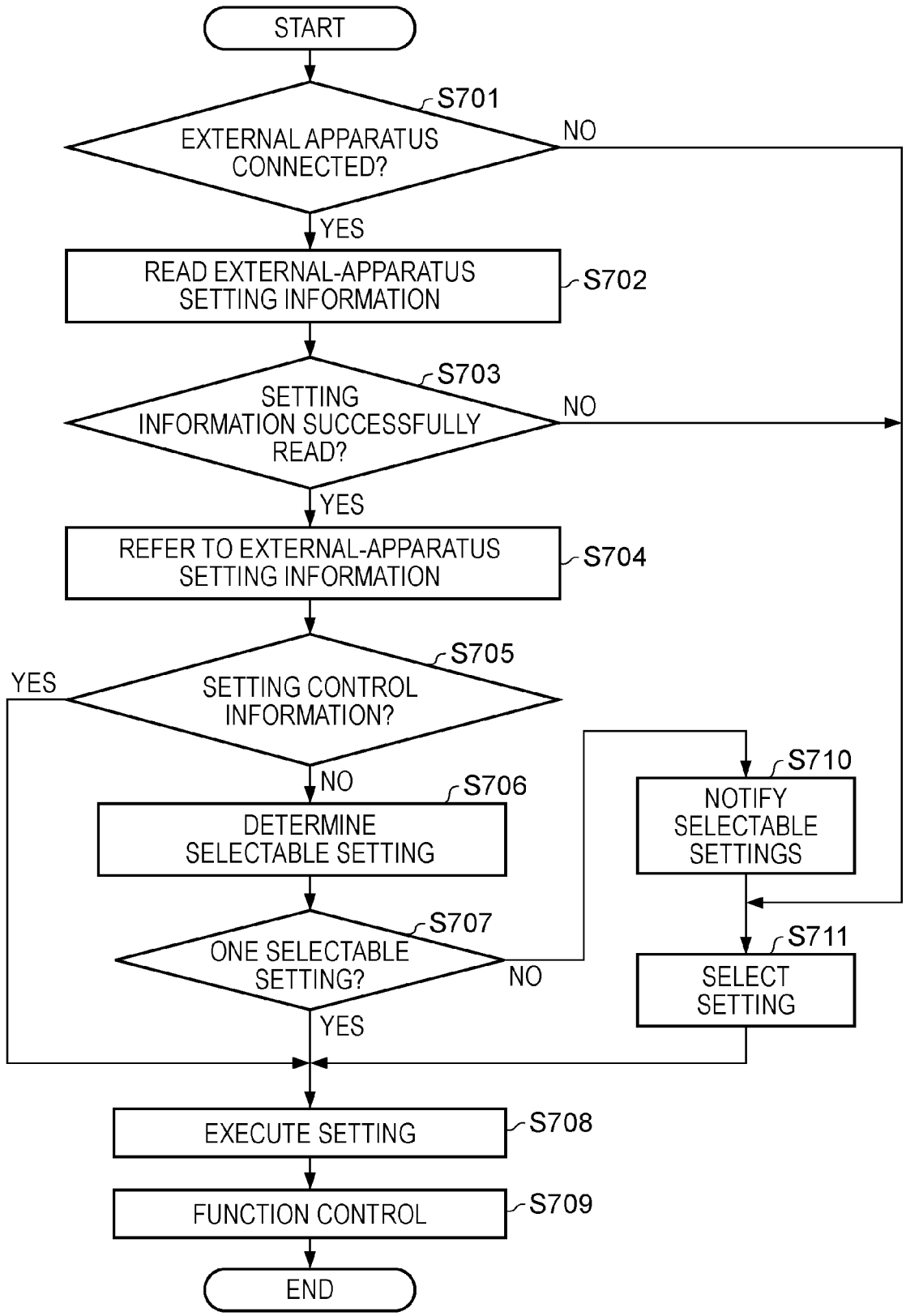

FIG. 9

| SETTING | COMBINING | DISTORTION CORRECTION | | | | | IMAGE PROCESSOR | | |
|---|---|---|---|---|---|---|---|---|---|
| | | CAPTURE | CAPTURE /INVERSE | DISPLAY | CAPTURE + DISPLAY | CAPTURE | CAPTURE /INVERSE | DISPLAY | CAPTURE + DISPLAY |
| 1 | NOT APPLICABLE | — | — | — | CAPTURED | — | — | — | — |
| 2 | | CAPTURED | — | — | — | — | — | — | — |
| 3 | | — | — | CAPTURED | — | — | — | — | — |
| 4 | | — | — | — | — | — | — | — | — |
| 5 | HMD | — | — | — | COMBINED | — | CG | — | — |
| 6 | | — | — | — | CAPTURED | — | — | CG | — |
| 7 | | CAPTURED | — | — | — | — | — | — | — |
| 8 | | COMBINED | — | COMBINED | — | — | CG | — | — |
| 9 | | — | — | CAPTURED | — | — | — | CG | — |
| 10 | | — | — | — | COMBINED | — | CG | — | — |
| 11 | | — | — | — | CAPTURED | — | — | CG | — |
| 12 | | — | — | COMBINED | — | — | CG | — | — |
| 13 | | — | — | CAPTURED | — | — | — | — | — |
| 14 | IMAGE PROCESSING APPARATUS | CAPTURED | — | COMBINED | — | — | — | — | — |
| 15 | | — | — | — | — | CAPTURED | — | COMBINED | — |
| 16 | | — | — | — | — | CAPTURED | — | — | — |
| 17 | | CAPTURED | — | — | — | — | CG | — | — |
| 18 | | COMBINED | — | — | — | — | — | — | — |
| 19 | | — | — | — | — | — | — | COMBINED | — |
| 20 | | — | — | COMBINED | — | — | — | — | — |
| 21 | | — | — | CAPTURED | — | — | — | DISPLAYED | — |
| 22 | | — | — | — | — | — | — | — | — |

FIG. 11

| SETTING | COMBINING | FIRST DISTORTION CORRECTOR | | | | SECOND DISTORTION CORRECTOR | | | |
|---|---|---|---|---|---|---|---|---|---|
| | | CAPTURE | CAPTURE /INVERSE | DISPLAY | CAPTURE +DISPLAY | CAPTURE | CAPTURE /INVERSE | DISPLAY | CAPTURE +DISPLAY |
| 1 | COMBINING | — | — | — | — | — | — | — | — |
| 2 | | EXTERNAL | — | — | — | — | — | — | — |
| 3 | | EXTERNAL | — | — | — | — | — | EXTERNAL | — |
| 4 | | — | — | EXTERNAL | — | — | — | — | — |
| 5 | NOT APPLICABLE | — | — | — | EXTERNAL | — | — | — | — |
| 6 | | — | — | — | CG | — | — | — | — |
| 7 | | CG | — | — | — | — | — | CG | — |
| 8 | | CG | CG | — | — | — | — | — | — |
| 9 | | — | — | CG | — | — | — | — | — |
| 10 | | — | — | — | — | — | — | — | — |
| 11 | | — | — | — | — | — | — | — | — |
| 12 | IMAGE PROCESSING APPARATUS | EXTERNAL | — | — | EXTERNAL | — | — | — | — |
| 13 | | EXTERNAL | — | — | EXTERNAL | — | — | — | — |
| 14 | | — | — | — | — | — | CG | — | — |
| 15 | | — | — | EXTERNAL | — | — | — | — | — |
| 16 | | — | CG | — | — | COMBINED | — | — | — |
| 17 | | — | — | — | — | — | — | COMBINED | — |
| 18 | | — | — | — | — | — | — | COMBINED | — |
| 19 | | — | — | — | — | — | — | CG | — |

DISPLAY APPARATUS WITH IMAGE-CAPTURING FUNCTION, IMAGE PROCESSING APPARATUS, IMAGE PROCESSING METHOD, AND IMAGE DISPLAY SYSTEM

CROSS REFERENCE TO RELATED APPLICATIONS

This application is a divisional application of U.S. patent application Ser. No. 11/751,772 filed May 22, 2007, which claims the benefit of Japanese Applications No. 2006-141621 filed May 22, 2006 and No. 2007-015064 filed Jan. 25, 2007, which are hereby incorporated by reference herein in their entirety.

BACKGROUND OF THE INVENTION

1. Field of the Invention

The present invention relates to a display apparatus with an image-capturing function, an image processing apparatus, an image processing method, and an image display system.

2. Description of the Related Art

In general, when display apparatuses with an image-capturing function are used in mixed realty (MR) environments, images captured by image pickup devices are loaded into a personal computer (PC) to perform distortion correction processing to correct distortion caused by the image pickup devices. The display apparatuses with an image-capturing function are hereinafter referred to as "head mounted displays (HMDs)." The HMDs are not limited to head-mounted type apparatuses, and may include hand-held type apparatuses such as binoculars.

The PC combines computer graphics (CG) images with the corrected images, and supply the combined images to display devices for display. A correction technique of the related art for distortion caused by the image-capturing system is disclosed in S. Uchiyama et al., "MR Platform: A basic body on which mixed reality applications are built," Proc. IEEE/ACM Internat. Symp. on Mixed and Augmented Reality (ISMAR 2002), pp. 246-253, 2002.

Correction for distortion caused by the display system of the HMDs, on the other hand, has not been much taken into account, and there has been a problem in that displayed images are distorted when the display system of the HMDs has a wide angle field of view. If distortion correction for the display system is simply introduced to compensate for this distortion, images corrected for distortion caused by the image-capturing system are again corrected for distortion caused by the display system.

Therefore, when images captured using the HMDs are to be directly observed using the display devices of the HMDs, an arithmetic operation for distortion correction is performed twice. There arises a problem in that the quality of finally displayed images is lowered by arithmetic errors.

Another problem occurs when HMDs have different distortion correction functions, for example, when an HMD has a built-in distortion correction function for the image-capturing system and another HMD does not have such a function. In this case, even if PCs uniformly perform correction processing, distortion-corrected images are further subjected to distortion correction processing, and displayed images may be distorted.

SUMMARY OF THE INVENTION

The present invention provides a display apparatus with an image-capturing function in which distortion caused by the image-capturing system and display system of the display apparatus with an image-capturing function can be appropriately corrected within the overall system including the display apparatus with an image-capturing function and an external apparatus.

According to an aspect, the present invention includes a display apparatus with an image-capturing function, including an outputting unit configured to output an image signal to an external apparatus; an inputting unit configured to input an image signal from the external apparatus; an image-capturing unit; a display unit; an image-capture-distortion corrector configured to perform image-capture-distortion correction on an image signal captured by the image-capturing unit; a display-distortion corrector configured to perform display-distortion correction; and a controller configured to control whether or not the image-capture-distortion corrector is to perform the image-capture-distortion correction, and whether or not the display-distortion corrector is to perform the display-distortion correction.

According to another aspect, the present invention provides an image processing method for a display apparatus with an image-capturing function, the display apparatus including an outputting unit configured to output an image signal to an external apparatus, an inputting unit configured to input an image signal from the external apparatus, an image-capturing unit, and a display unit, the image processing method including an image-capture-distortion correcting step of performing image-capture-distortion correction on an image signal captured by the image-capturing unit; a display-distortion correcting step of performing display-distortion correction; and a controlling step of controlling whether or not the image-capture-distortion correction is to be performed in the image-capture distortion correcting step, and whether or not the display-distortion correction is to be performed in the display-distortion correcting step.

According to still another aspect, the present invention provides an image display system including a display apparatus with an image-capturing function, including an inputting unit configured to input an image signal from an external apparatus, an outputting unit configured to output an image signal to an external apparatus, an image-capturing unit configured to capture a real-space image, and a display unit configured to display an image; an image processing apparatus including an image generator configured to generate a combining image to be combined with the real-space image captured by the image-capturing unit of the display apparatus with an image-capturing function; an image combining unit configured to combine the image generated by the image generator with the real-space image captured by the image-capturing unit to generate a combined image; a setting unit configured to set a distortion-correction type; and a distortion corrector configured to correct image distortion according to the distortion-correction type set by the setting unit.

According to still another aspect, the present invention provides an image processing apparatus including an inputting unit configured to input an image signal from an external apparatus; an image generator configured to generate a combining image to be combined with an external input image input to the image processing apparatus; an outputting unit configured to output an image signal to the external apparatus; an image combining unit configured to combine the combining image with the external input image; at least one distortion corrector configured to correct image distortion; and a setting unit configured to set a type of distortion correction performed by the distortion corrector and to determine whether or not the image combining unit is to perform image combining.

Further features of the present invention will become apparent from the following description of exemplary embodiments with reference to the attached drawings.

BRIEF DESCRIPTION OF THE DRAWINGS

FIG. 6 is a table showing settings of the HMD according to the fifth embodiment.

FIG. 7 is a flowchart showing a setting process according to the fifth embodiment.

FIG. 9 is a table showing settings of the image display system according to the sixth embodiment.

FIG. 11 is a table showing settings of the image processing apparatus according to the seventh embodiment.

DESCRIPTION OF THE EMBODIMENTS

First Embodiment

A first embodiment of the present invention will now be described with reference to the accompanying drawings.

In the first embodiment, a display apparatus with an image-capturing function is implemented as a display apparatus including an image-capturing unit, such as a camera-equipped head mounted display (HMD), a camera-equipped hand-held display apparatus, or camera-equipped binoculars.

For the simplicity of description, the following description will be made in the context of a monocular apparatus. It is to be understood that a combination of two monocular apparatuses functions as a display apparatus with a stereo-image-capturing function.

Figure 1:
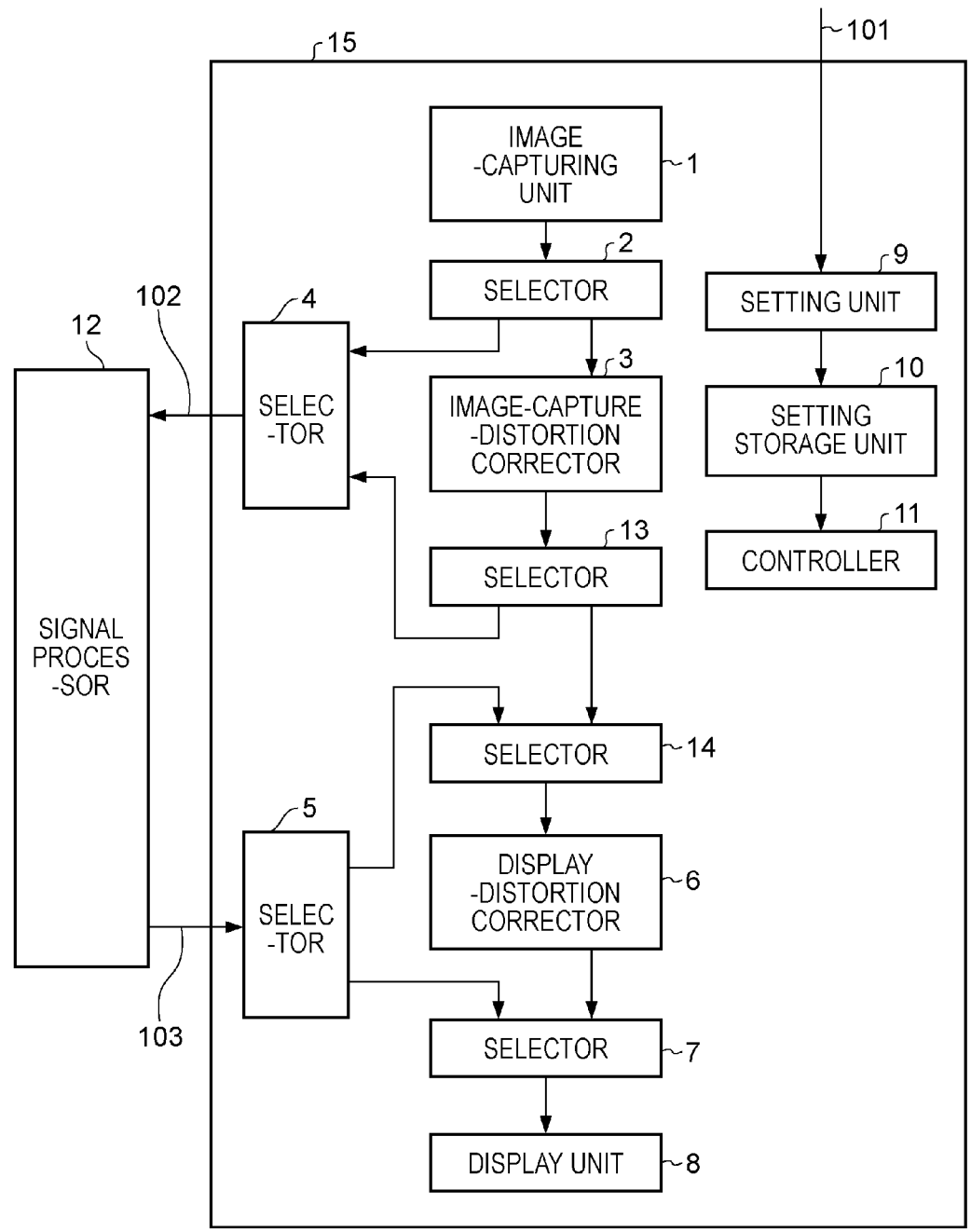
FIG. 1 is a schematic block diagram showing a first embodiment of the present invention.

FIG. 1 is a block diagram of an HMD (monocular) 15 of the first embodiment. The HMD 15 of the first embodiment is generally configured to output a signal (image signal) of an image captured using a built-in image-capturing unit to an external apparatus such as a personal computer (PC). The PC combines a computer graphics (CG) image with the image signal, and outputs a combined image. The HMD 15 displays on a display unit an image signal indicating the combined image output from the PC.

Referring to FIG. 1, the HMD 15 includes an image-capturing unit 1 configured to capture a real-world image, selectors 2, 4, 5, 7, 13, and 14, an image-capture-distortion corrector 3, a display-distortion corrector 6, a display unit 8, a setting unit 9, a setting storage unit 10, and a controller 11.

The image signal of the real-world image captured using the image-capturing unit 1 is output to the image-capture-distortion corrector 3 or the selector 4 via the selector 2 under control of the controller 11. The image-capture-distortion corrector 3 corrects lens distortion and other distortion components included in the received signal, and outputs the corrected signal to the selector 13. The selector 13 outputs the distortion-corrected signal to the selector 4 or 14 according to an instruction from the controller 11. The selector 4 outputs to an external signal processor 12 the distortion-corrected signal or the original image signal as a signal 102 according to an instruction from the controller 11. The signal processor 12 may be, for example, an information processing apparatus such as a PC or an image processing apparatus. Although not shown in the first embodiment, sensors for obtaining either position or orientation or both, such as a magnetic sensor or a gyro sensor, may be connected to the signal processor 12.

The signal processor 12 outputs a processed signal 103 to the selector 5. The selector 5 outputs the signal 103 to the selector 7 or 14 according to an instruction from the controller 11. The selector 14 outputs to the display-distortion corrector 6 a signal input via the selector 13, which has been corrected for the image-capture-distortion, or the signal 103 input from outside via the selector 5 according to an instruction from the controller 11. The display-distortion corrector 6 performs correction processing for canceling out display distortion, and outputs the processed result to the selector 7. The selector 7 outputs to the display unit 8 the display-distortion-corrected signal input from the display-distortion corrector 6 or the signal input from the selector 5 according to an instruction from the controller 11. The display unit 8 displays an image based on the received signal.

The setting unit 9 sets operating conditions of the controller 11. There are various methods for setting the operating conditions, such as a method for setting the operating conditions by a signal 101 from the outside, a method for directly setting the operating conditions on a setting panel or the like, or a method for setting the operating conditions via a medium such as a Universal Serial Bus (USB) memory or a Compact Flash card.

The information set by the setting unit 9 is stored in the setting storage unit 10. The controller 11 controls the components of the HMD 15 according to the setting information stored in the setting storage unit 10. The information stored in the setting storage unit 10 can be read from an external apparatus or the like. The information stored in the setting storage unit 10 can be used to identify the operation of the HMD 15. Therefore, processing errors, such as correction for the image-capture distortion by both the HMD 15 and an external apparatus, can be prevented.

The information stored in the setting storage unit 10 has five modes as follows.

In Mode 1, the HMD 15 outputs an image signal to the outside without correcting the image-capture distortion. The HMD 15 displays the signal 103 input from the outside without performing display-distortion correction.

In Mode 2, the HMD 15 outputs an image signal to the outside without correcting the image-capture distortion. The HMD 15 performs display-distortion correction on the signal 103 input from the outside, and displays the display-distortion corrected signal.

In Mode 3, the HMD 15 performs image-capture-distortion correction on a captured image signal, and outputs the signal corrected for the image-capture distortion to the outside. The HMD 15 displays the signal 103 input from the outside without performing display-distortion correction.

In Mode 4, the HMD 15 performs image-capture-distortion correction on a captured image signal, and outputs the signal corrected for the image-capture distortion to the outside. The HMD 15 performs display-distortion correction on the signal 103 input from the outside, and displays the display-distortion corrected signal.

In Mode 5, the HMD 15 performs image-capture-distortion correction on a captured image signal using the image-capture-distortion corrector 3, and outputs the resulting signal directly (without outputting the result to the outside) to the display-distortion corrector 6 via the selectors 13 and 14. The display-distortion corrector 6 performs display-distortion correction, and the resulting signal is displayed.

If the information set in the setting storage unit 10 has Mode 1, the signal from the image-capturing unit 1 is output to the outside as the signal 102 via the selectors 2 and 4. The signal 103 input from the outside is supplied to the display unit 8 via the selectors 5 and 7.

If the information set in the setting storage unit 10 has Mode 2, the signal from the image-capturing unit 1 is output to the outside as the signal 102 via the selectors 2 and 4. The signal 103 input from the outside is input to the display-distortion corrector 6 via the selectors 5 and 14. The display-distortion corrector 6 performs display-distortion correction so as to provide correct display. The resulting signal is supplied to the display unit 8 via the selector 7.

If the information set in the setting storage unit 10 has Mode 3, the signal from the image-capturing unit 1 is output to the image-capture-distortion corrector 3 via the selector 2. The image-capture-distortion corrector 3 performs distortion correction on the captured image, and the corrected signal is output to the outside as the signal 102 via the selectors 13 and 4. The signal 103 input from the outside is supplied to the display unit 8 via the selectors 5 and 7.

If the information set in the setting storage unit 10 has Mode 4, the signal from the image-capturing unit 1 is output to the image-capture-distortion corrector 3 via the selector 2. The image-capture-distortion corrector 3 performs distortion correction on the captured image, and the corrected signal is output to the outside as the signal 102 via the selectors 13 and 4. The signal 103 input from the outside is input to the display-distortion corrector 6 via the selectors 5 and 14. The display-distortion corrector 6 performs display-distortion correction so as to provide correct display. The resulting signal is supplied to the display unit 8 via the selector 7.

If the information set in the setting storage unit 10 has Mode 5, the signal from the image-capturing unit 1 is output to the image-capture-distortion corrector 3 via the selector 2. The image-capture-distortion corrector 3 performs distortion correction on the captured image, and the corrected signal is input to the display-distortion corrector 6 via the selectors 13 and 14. The display-distortion corrector 6 performs display-distortion correction so as to provide correct display. The resulting signal is supplied to the display unit 8 via the selector 7.

The modes are selected via a communication line (not shown) from the signal processor 12 or according to an instruction from a setting panel (not shown). There have been proposed various distortion correction techniques, and any of such techniques can be employed. A detailed description thereof is thus omitted.

With this structure, image-capture distortion and display distortion can be corrected within an HMD, and a signal processor does not need to take correction for the display distortion into account. Since whether or not distortion correction is to be performed can be selected depending on the processing performance of the signal processor, the correction processing can be flexibly performed according to the performance of the signal processor. For example, when the signal processor has high processing performance, the correction processing may be partially performed by the signal processor.

While the first embodiment has been described in the context of a monocular HMD, another circuit having a similar structure to that of the monocular HMD can be added to realize a stereo HMD. Such a stereo HMD may include one setting unit 9, one setting storage unit 10, and one controller 11. In this case, two correction processes for the image-capturing system and the display system, which correspond to the left and right eyes, are not performed individually for the left and right eyes.

Second Embodiment

In the first embodiment, a captured image can be corrected and directly displayed without the intervention of a signal processor.

In this case, however, the distortion correction processing is performed twice, that is, correction for distortion of the captured image and correction for distortion of the displayed image are performed. The quality of a displayed image may therefore be degraded by arithmetic errors or the like.

A second embodiment of the present invention provides a structure that addresses this problem. As in the first embodiment, the second embodiment will also be described in the context of a monocular HMD. However, as in the first embodiment, the second embodiment can also be extended to a stereo HMD.

Figure 2:
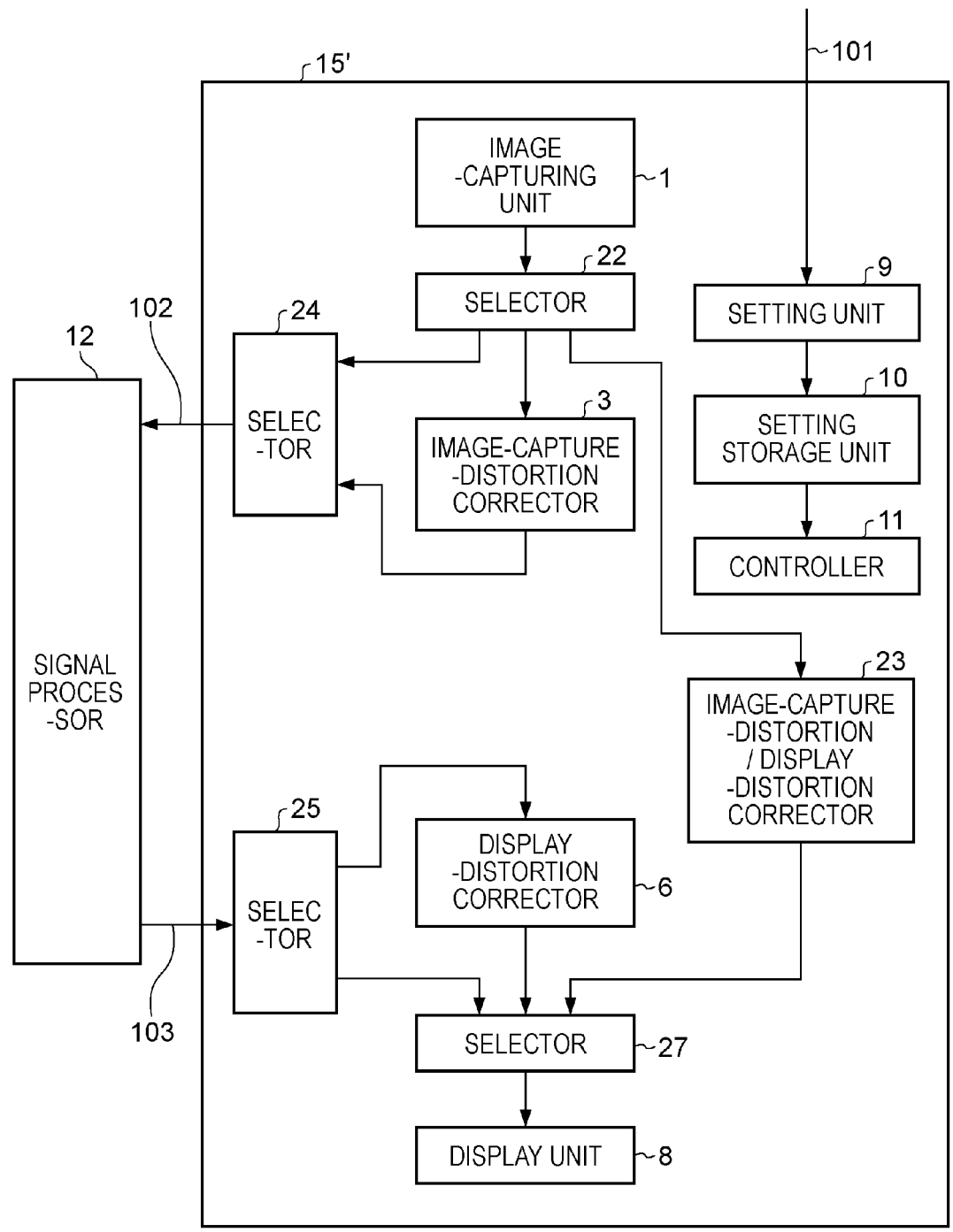
FIG. 2 is a schematic block diagram showing a second embodiment of the present invention.

The structure of the second embodiment will be described with reference to FIG. 2. In FIG. 2, the same components as those shown in FIG. 1 are represented by the same reference numerals.

As in the first embodiment, the information stored in the setting storage unit 10 has any of Modes 1 through 5. The controller 11 operates appropriately according to the information stored in the setting storage unit 10.

If the information set in the setting storage unit 10 has Mode 1, the signal from the image-capturing unit 1 is output to the outside as the signal 102 via selectors 22 and 24. The signal 103 input from the outside is supplied to the display unit 8 via selectors 25 and 27.

If the information set in the setting storage unit 10 has Mode 2, the signal from the image-capturing unit 1 is output to the outside as the signal 102 via the selectors 22 and 24. The signal 103 input from the outside is input to the display-distortion corrector 6 via the selector 25. The display-distortion corrector 6 performs display-distortion correction so as to provide correct display. The resulting signal is supplied to the display unit 8 via the selector 27.

If the information set in the setting storage unit 10 has Mode 3, the signal from the image-capturing unit 1 is output to the image-capture-distortion corrector 3 via the selector 22. The image-capture-distortion corrector 3 performs distortion correction on the captured image, and the corrected signal is output to the outside as the signal 102 via the selector 24. The signal 103 input from the outside is supplied to the display unit 8 via the selectors 25 and 27.

If the information set in the setting storage unit 10 has Mode 4, the signal from the image-capturing unit 1 is output to the image-capture-distortion corrector 3 via the selector 22. The image-capture-distortion corrector 3 performs distortion correction on the captured image, and the corrected signal is output to the outside as the signal 102 via the selector 24. The signal 103 input from the outside is input to the display-distortion corrector 6 via the selector 25. The display-distortion corrector 6 performs display-distortion correction so as to provide correct display. The resulting signal is supplied to the display unit 8 via the selector 27.

If the information set in the setting storage unit 10 has Mode 5, which is a feature of the second embodiment, the signal from the image-capturing unit 1 is output to an image-capture-distortion/display-distortion corrector 23 via the selector 22. The image-capture-distortion/display-distortion corrector 23 corrects distortion of the captured image and display distortion at the same time by performing a single arithmetic operation. The resulting signal is supplied to the display unit 8 via the selector 27.

The distortion caused by the image-capturing system and the distortion caused by the display system may be corrected at the same time by, for example, performing the measurements below and performing conversion for canceling the measurements:

(a) to display directly on the display unit 8 (without performing any correction) an image in which a grid point whose geometric information is known is captured using the image-capturing unit 1;

(b) to obtain the image displayed on the display unit 8 via the display optical system, and to measure the amount of displacement by which the obtained grid point is displaced with respect to the corresponding original grid point; and (c) to derive a conversion for canceling the measured amount of displacement, and to implement the conversion by the image-capture-distortion/display-distortion corrector 23.

If a design value of the optical system is available, a conversion formula may be determined using the value.

Instead of determining a conversion formula, if information for the display system (such as the number of vertical and horizontal pixels and the field angle) is known, values converted in advance can be stored in the form of a table. In this case, distortion correction can be performed by simple processing.

The signal from the image-capturing system may be output directly to the display system when a mode is set according to an instruction from the signal processor 12 or the setting panel or when the communication with the signal processor 12 is interrupted.

A signal check unit configured to check a signal between the selector 27 and the display unit 8 shown in FIG. 2 can be provided to check whether or not there is a signal from the signal processor 12. The communication status from the signal processor 12 can be recognized. That is, if the signal transmission from the signal processor 12 is interrupted in any of Modes 1 through 4, a mode-changing unit (not shown) automatically changes the current mode to Mode 5. The HMD user can be notified of the state of the external environment even if the signal transmission from the signal processor 12 is interrupted. Therefore, advantageously, the HMD user can obtain a comfortable field of view.

Accordingly, since distortion caused by the image-capturing system and distortion caused by the display system can be corrected by a single arithmetic operation, the amount of arithmetic error can be reduced. The degradation of the quality of the finally obtained displayed image can be minimized.

Third Embodiment

In a third embodiment of the present invention, the processing performed by a plurality of distortion correction circuits in the first and second embodiments is performed by a single circuit in a time-division manner. Therefore, the circuit structure can be simplified.

Figure 3:
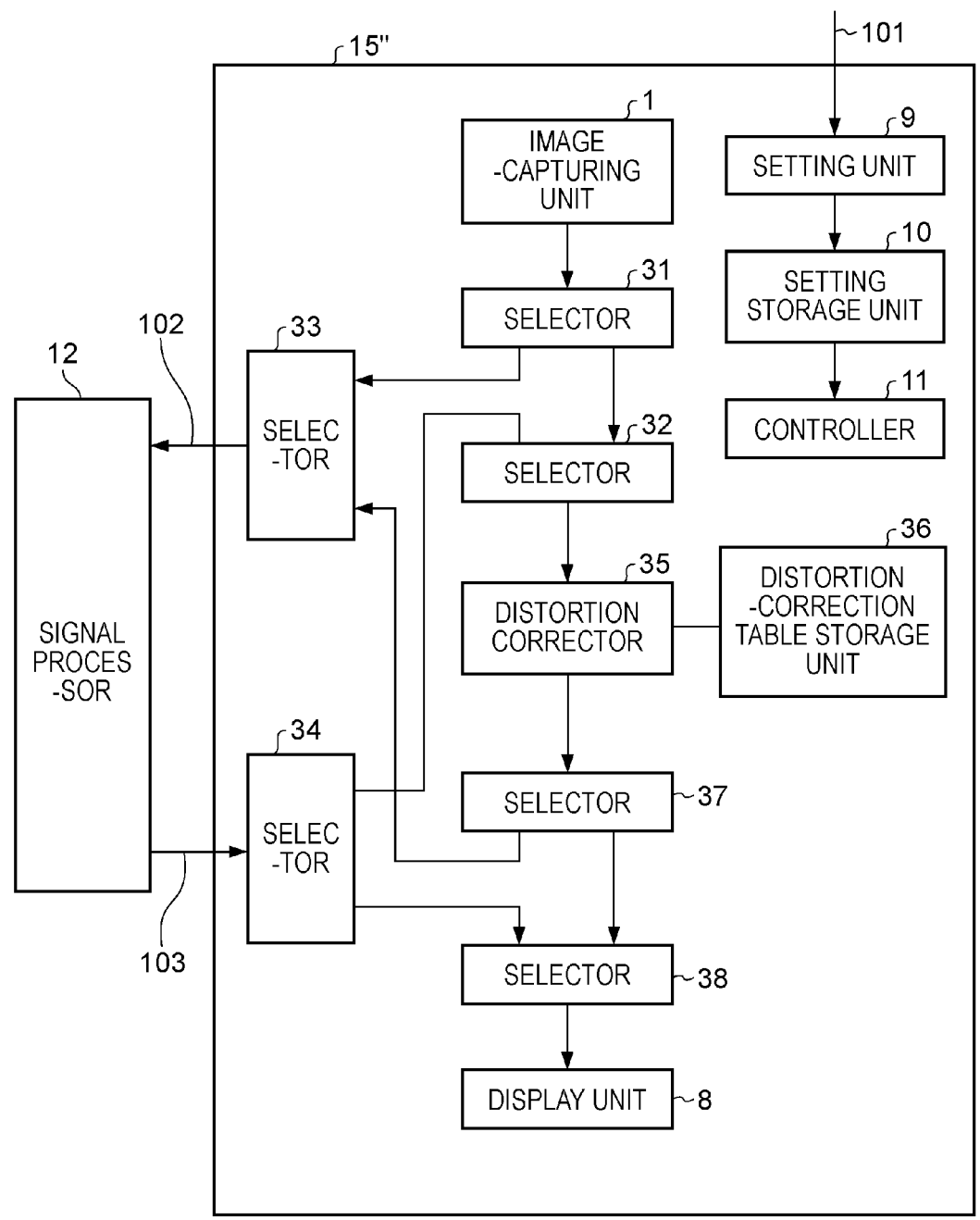
FIG. 3 is a schematic block diagram showing a third embodiment of the present invention.

The structure of the third embodiment will be described with reference to FIG. 3. In FIG. 3, the same components as those shown in FIG. 1 are represented by the same reference numerals.

An HMD 15" of the third embodiment includes an image-capturing unit 1, a display unit 8, a setting unit 9, a setting storage unit 10, a controller 11, selectors 31, 32, 33, 34, 37, and 38, a distortion corrector 35, and a distortion-correction table storage unit 36. The distortion-correction table storage unit 36 stores distortion correction data for the image-capturing system, distortion correction data for the display system, and data for correcting distortion caused by the image-capturing system and distortion caused by the display system at the same time. The data stored in the distortion-correction table storage unit 36 is not limited the data described above, and a plurality of pieces of image-capture-distortion data, a plurality of pieces of display-distortion data, and so forth may be stored.

In the case of a stereo HMD, correction data for the right eye and correction data for the left eye are basically different from each other. Thus, both the correction data for the right eye and the correction data for the left eye are stored. The information stored in the setting storage unit 10 has Modes 1 through 5, which are similar to those in the first embodiment.

With the above-described structure, if the information set in the setting storage unit 10 has Mode 1, the signal from the image-capturing unit 1 is output to the outside as the signal 102 via the selectors 31 and 33. The signal 103 input from the outside is supplied to the display unit 8 via the selectors 34 and 38.

If the information set in the setting storage unit 10 has Mode 2, the signal from the image-capturing unit 1 is output to the outside as the signal 102 via the selectors 31 and 33. The signal 103 input from the outside is input to the distortion corrector 35 via the selectors 34 and 32. The distortion corrector 35 retrieves distortion table information corresponding to the display-distortion correction from the distortion-correction table storage unit 36, and performs distortion correction using the retrieved information. The corrected result is supplied to the display unit 8 via the selectors 37 and 38.

If the information set in the setting storage unit 10 has Mode 3, the signal from the image-capturing unit 1 is output to the distortion corrector 35 via the selectors 31 and 32. The distortion corrector 35 retrieves a distortion correction table corresponding to image-capture-distortion data from the distortion-correction table storage unit 36, and corrects the image-capture distortion using the retrieved information. The corrected signal is output to the outside as the signal 102 via the selectors 37 and 33. The signal 103 input from the signal processor 12 is supplied to the display unit 8 via the selectors 34 and 38.

If the information set in the setting storage unit 10 has Mode 4, the signal from the image-capturing unit 1 is output to the distortion corrector 35 via the selectors 31 and 32. The distortion corrector 35 retrieves a distortion correction table corresponding to image-capture-distortion data from the distortion-correction table storage unit 36, and corrects the image-capture distortion using the retrieved information. The corrected signal is output to the outside as the signal 102 via the selectors 37 and 33. The signal 103 input from the signal processor 12 is input to the distortion corrector 35 via the selectors 34 and 32. The distortion corrector 35 retrieves a distortion correction table corresponding to display-distortion data from the distortion-correction table storage unit 36, and corrects the display distortion using the retrieved information. The result is supplied to the display unit 8 via the selectors 37 and 38.

If the information set in the setting storage unit 10 has Mode 5, the signal from the image-capturing unit 1 is output to the distortion corrector 35 via the selectors 31 and 32. The distortion corrector 35 retrieves a distortion correction table corresponding to image-capture-distortion data and display-distortion data from the distortion-correction table storage unit 36, and corrects the distortion of the captured image and the display distortion at the same time by performing a single arithmetic operation using the retrieved information. The result is supplied to the display unit 8 via the selectors 37 and 38.

With the above-described structure, the distortion-correction processing is performed using only one distortion correction circuit. Therefore, the circuit structure can be simplified and the circuit size can be reduced.

Fourth Embodiment

By controlling the setting storage unit 10 from the signal processor 12 (such as a PC), various advantages can be achieved. For example, the distortion-correction modes are controlled from an external apparatus (to change the mode of the HMD, to read the mode set in the HMD, etc.), thereby preventing redundant distortion correction performed by the HMD and the external apparatus.

Another method for reducing the amount of arithmetic error for the finally displayed image signal is that the signal processor 12 shown in FIG. 3 generates a CG image with image-capture distortion. That is, the generated CG image is not a general distortion-free image, but an image having image-capture distortion, which is similar to the image obtained through the image-capturing system (i.e., the image signal whose distortion is not corrected). The generated CG image and the image signal whose distortion is not corrected, which is obtained from the image-capturing unit 1, are combined to generate a combined image signal. The combined image signal is subjected to image-capture-distortion/display-distortion correction processing, and the resulting signal is output.

With the above-described structure, the correction processing can be performed by a single arithmetic operation, and an accumulation of arithmetic errors can be avoided. Therefore, the degradation of the quality of the displayed image can be reduced or suppressed.

A texture-mapping method may be used as a method for generating an image taking display distortion into account. It is determined how a grid point in an original image is displaced to provide correct display through the display system, and texture mapping is performed using the correspondence of the grid point. Therefore, the image taking the display distortion into account can be easily generated.

Fifth Embodiment

A fifth embodiment of the present invention will be described with reference to the drawings.

Figure 4:
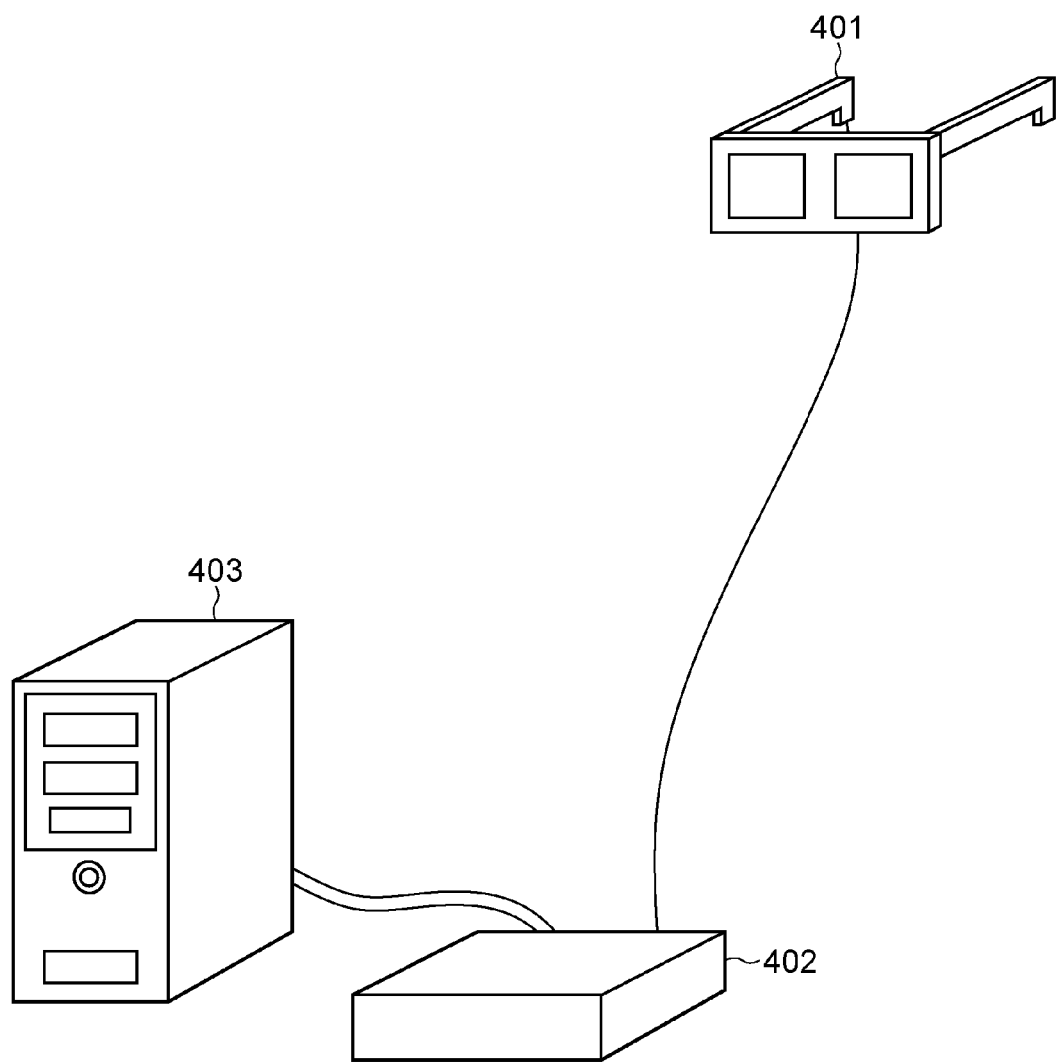
FIG. 4 is a schematic diagram of an MR system according to a fifth embodiment of the present invention.

FIG. 4 is a diagram showing the structure of an MR system according to the fifth embodiment.

A video see-through HMD 401 includes an image-capturing unit and an image display unit. The image-capturing unit is configured to capture an image (hereinafter referred to as a "real-space image") of the real space observed by the user of the HMD 401. The image display unit includes an image display section configured to provide the user with an MR image in which the CG image generated by an image processing apparatus 403 is superimposed on the captured real-space image, the captured real-space image, an image output from the image processing apparatus 403, or the like.

The HMD 401 communicates with a controller unit 402 connected to the HMD 401. The communication performed between the HMD 401 and the controller unit 402 is not limited to wired communication, and may be implemented using a wireless communication system for establishing a small-scale network such as a wireless local area network (WLAN) or a wireless personal area network (WPAN).

The HMD 401 can be driven by power supply from the controller unit 402 or can be driven by a battery.

The image processing apparatus 403 is connected to the controller unit 402 via a wired system, and includes an image processor for drawing a CG image. The image processing apparatus 403 communicates with the HMD 401 via the controller unit 402. The HMD 401 combines the received CG image with the real-space image captured by the HMD 401, and displays the resulting combined MR image on the image display unit to provide it to the HMD user.

While the image processing apparatus 403 and the controller unit 402 are illustrated as separate hardware units in FIG. 4, all functions of the controller unit 402 may be incorporated in the image processing apparatus 403 to combine the controller unit 402 and the image processing apparatus 403 into one unit. Alternatively, the functions of the image processing apparatus 403 and the functions of the controller unit 402 may be collected to configure a dedicated image processing apparatus. The HMD 401 does not necessarily have an image combining function. The image combining function may be incorporated in the image processing apparatus 403 or the controller unit 402.

A combination of the functions of the image processing apparatus 403 and the functions of the controller unit 402 is hereinafter referred to as an "image processing apparatus" in terms of the functional viewpoint.

Figure 5:
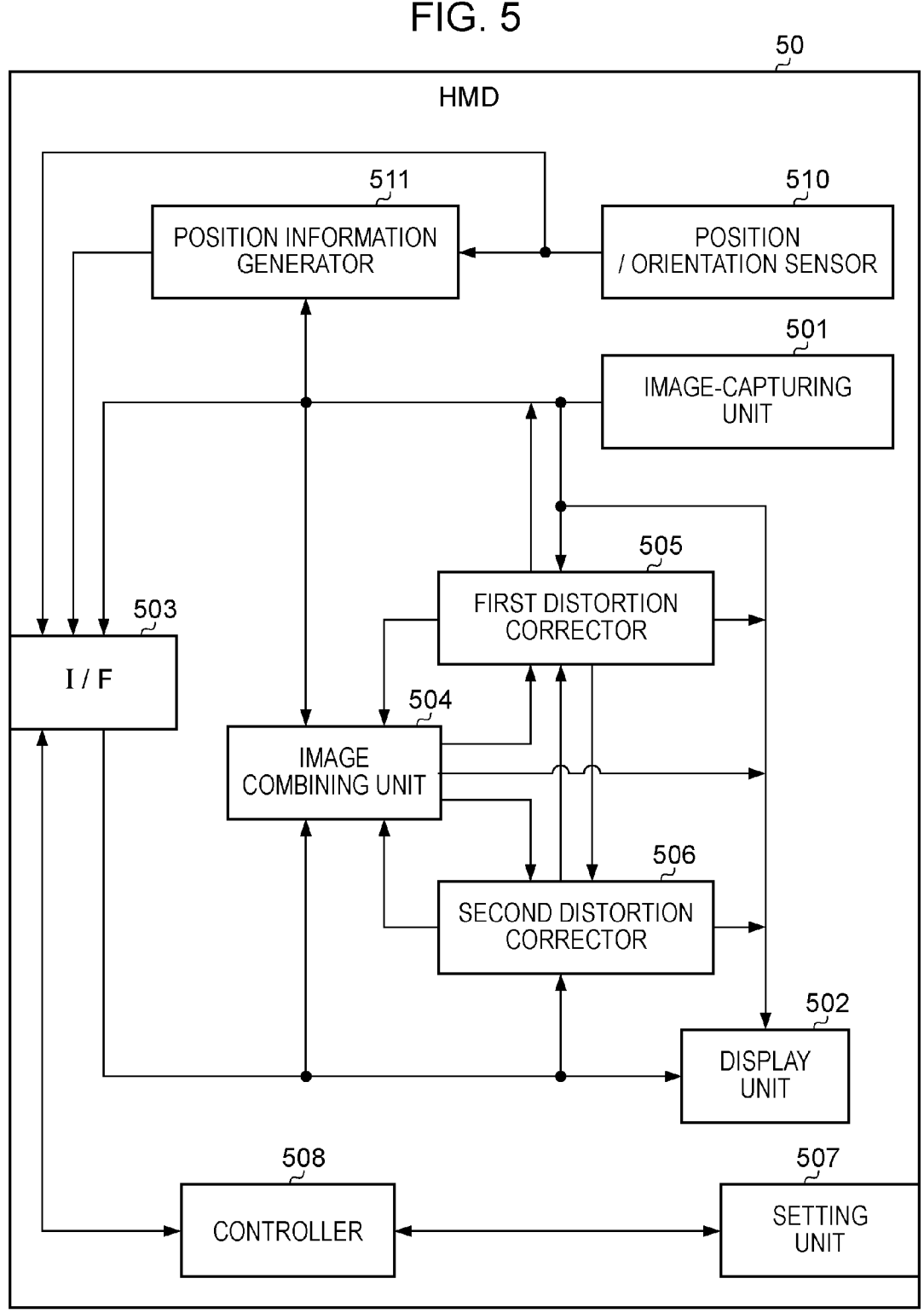
FIG. 5 is a schematic block diagram of an HMD according to the fifth embodiment.

FIG. 5 is a functional block diagram of an HMD 50 according to the fifth embodiment of the present invention.

The HMD 50 includes image-capturing unit 501, a display unit 502, an interface (I/F) 503, an image combining unit 504, a first distortion corrector 505, a second distortion corrector 506, a setting unit 507, a controller 508, a position/orientation sensor 510, and a position information generator 511.

As shown in FIG. 5, the first distortion corrector 505 and the second distortion corrector 506 have different paths to the other functional blocks, and one of the first distortion corrector 505 and the second distortion corrector 506 can restrict the functions of the other. However, the paths to the other functional blocks may be equal to each other so that the first distortion corrector 505 and the second distortion corrector 506 can be utilized without distinction.

The image-capturing unit 501 captures an image of the real space observed by the HMD user, and generates a captured image. The display unit 502 displays the image to the HMD user. The I/F 503 communicates with an external apparatus connected to the HMD 50. The image combining unit 504 combines an external input image input from the external apparatus via the I/F 503 with the captured image captured using the image-capturing unit 501 to generate a combined image. The first distortion corrector 505 and the second distortion corrector 506 perform distortion correction on the captured image, the external input image, or the combined image. The setting unit 507 performs setting of the HMD 50, and the controller 508 controls the image combining unit 504, the first distortion corrector 505, the second distortion corrector 506, and the position information generator 511 according to the setting of the HMD 50.

While the setting is performed by the setting unit 507 in FIG. 5, setting information can be transmitted to the controller 508 from the external apparatus connected to the HMD 50 via the I/F 503.

The position/orientation sensor 510 obtains various types of sensing information needed for calculation of the spatial position or orientation of the HMD 50. The position information generator 511 generates three-dimensional position and orientation information of the HMD 50 using captured-image information of the image captured using the image-capturing unit 501 or the sensing information obtained by the position/orientation sensor 510. The three-dimensional position and orientation information is used for the external apparatus to generate an image to be combined with the captured image. When the external apparatus has the position information generation function, the position information generator 511 of the HMD 50 is not used, and the captured image captured using the image-capturing unit 501 or the sensing information obtained by the position/orientation sensor 510 is transmitted to the external apparatus via the I/F 503 so that the external apparatus can generate three-dimensional position and orientation information.

FIG. 6 is a table showing settings that can be made in the HMD 50 according to the fifth embodiment.

In the table, the notation "captured" indicates that the captured image is subjected to correction defined in the distortion-correction column. The notation "external" indicates that the external input image input from the external apparatus is subjected to correction defined in the distortion-correction column. The notation "combined" indicates that the combined image is subjected to correction defined in the distortion-correction column.

In the table, the column with the heading "combining" indicates whether the HMD 50 or the external apparatus is to perform image combining. Settings whose combining column is set to "not applicable" indicate the type in which the image captured using the image-capturing unit 501 of the HMD 50 is not output to the external apparatus or is not combined within the HMD 50 but the captured image is displayed on the display unit 502. Settings whose combining column is set to "HMD" indicate the type in which the image captured using the image-capturing unit 501 and the external input image input via the I/F 503 are combined within the HMD 50 and the resulting combined image is displayed on the display unit 502. Settings whose combining column is set to "external apparatus" indicate the type in which the external apparatus combines the image to be combined with the captured image and the resulting combined image is input from the I/F 503 and is displayed on the display unit 502, or the type in which the external apparatus or the HMD 50 does not perform image combining and an image is input to the HMD 50 from the I/F 503 and is displayed on the display unit 502.

The operations in the settings defined in the table shown in FIG. 6 will be described with reference to the block diagram shown in FIG. 5.

Settings 1 through 5 indicate the type in which the captured image captured using the image-capturing unit 501 of the HMD 50 is displayed on the display unit 502.

In setting 1, the first distortion corrector 505 performs distortion correction processing on the captured image obtained by the image-capturing unit 501 to correct the image-capture distortion and the display distortion at the same time, and the corrected image is displayed on the display unit 502.

In setting 2, the image-capture distortion and display distortion of the captured image are corrected by the first distortion corrector 505 and the second distortion corrector 506, respectively. The corrected image is displayed on the display unit 502.

In setting 3, the first distortion corrector 505 corrects the image-capture distortion, and the corrected image is displayed on the display unit 502.

In setting 4, the first distortion corrector 505 corrects the display distortion, and the corrected image is displayed on the display unit 502.

In setting 5, the captured image is directly displayed on the display unit 502 without being subjected to distortion correction processing.

In settings 1 and 2, both the image-capture distortion and the display distortion of the captured image are corrected. While in setting 1, the image-capture distortion and the display distortion are corrected at the same time by one iteration of the processing, setting 2 requires two iterations of the distortion correction processing. Therefore, setting 2 can have a larger arithmetic error than setting 1, and setting 1 is more effective.

Settings 3, 4, and 5 can be used when the HMD 50 has either image-capture distortion or display distortion or such distortion is negligible, or when the HMD 50 does not have image-capture distortion or display distortion or such distortion is negligible. Settings 3, 4, and 5 can also be intentionally used when the user does not desire distortion correction.

Settings 6 through 13 indicate the type in which the captured image captured using the image-capturing unit 501 and the external input image input from the I/F 503 are combined within the HMD 50, and the combined image is displayed on the display unit 502.

Settings 6 through 8 in which both the image-capture distortion and the display distortion are corrected will now be described in detail.

In setting 6, the second distortion corrector 506 applies distortion equal to the image-capture distortion caused by the HMD 50 to the external input image input from the external apparatus via the I/F 503. This operation is referred to as an "image-capture inverse distortion correction". In the image-capture inverse distortion correction process, instead of removing distortion before performing image combining, a combination of image-capture distortion and display distortion is corrected by one iteration of the process after images having the same type of distortion are combined.

Then, the image combining unit 504 combines the external input image with the captured image having image-capture distortion subjected to the image-capture inverse distortion correction. After the images are combined, the first distortion corrector 505 performs distortion correction processing on the resulting combined image to correct the image-capture distortion and the display distortion at the same time, and the corrected image is displayed on the display unit 502.

In setting 7, the first distortion corrector 505 corrects the captured image for the image-capture distortion, and combines the external input image with the corrected image. Then, the second distortion corrector 506 corrects the resulting combined image for the display distortion, and the corrected image is displayed on the display unit 502. In MR systems, generally, the external input image is a CG image, and it is considered that the degradation of the quality of the image perceived by the HMD user due to the arithmetic error caused by the distortion correction processing is less than that of a natural image such as a captured image of the real space. Therefore, the HMD user can perceive that the quality of the finally displayed combined image obtained in setting 6 in which the captured image, i.e., a natural image, is subjected to correction processing once although the CG image is subjected to correction processing twice is higher than that obtained in setting 7 in which the CG image is subjected to correction processing once although the captured image is subjected to correction processing twice.

In setting 8, the first distortion corrector 505 performs distortion correction processing on the captured image to correct the image-capture distortion and the display distortion at the same time, and the second distortion corrector 506 corrects the external input image for the display distortion. The image combining unit 504 combines those distortion-corrected images, and the corrected combined image is displayed on the display unit 502. In setting 8, both the captured image and the external input image are subjected to distortion correction once, resulting in a smaller arithmetic error than that in settings 6 and 7. Setting 8 is therefore more effective.

In settings 9 and 10, only the image-capture distortion is corrected. In settings 11 and 12, only the display distortion is corrected. In setting 13, no correction is applied for the image-capture distortion or the display distortion.

Settings 14 through 22 indicate the type in which the external apparatus combines the image to be combined with the captured image, and the combined image is input from the external apparatus via the I/F 503 and is displayed on the display unit 502, or the type in which an image that is not subjected to combining by the external apparatus is input from the external apparatus via the I/F 503 and is displayed on the display unit 502.

In settings 14, 17, 18, and 21, both the image-capture distortion and the display distortion are corrected within the HMD 50.

In settings 15 and 19, only the image-capture distortion is corrected within the HMD 50. In settings 16 and 20, only the display distortion is corrected within the HMD 50.

In setting 22, no correction is applied for the image-capture distortion or the display distortion within the HMD 50.

FIG. 7 is a flowchart showing an HMD setting process according to the fifth embodiment.

When the power is turned on, the HMD 50 determines whether or not an external apparatus has been connected (step S701). If an external apparatus has been connected, the HMD 50 reads setting information for the external apparatus (step S702), and determines whether or not the setting information has been read (step S703).

If the setting information owned by the external apparatus has been read, the HMD 50 refers to the setting information for the external apparatus (step S704), and determines whether or not the setting information includes information for making setting of the HMD 50 under the control of the external apparatus (step S705). If the information for making setting of the HMD 50 under the control of the external apparatus is included, the setting of the HMD 50 is executed according to the setting information (step S708), and the functions of the image combining unit 504, the distortion correctors 505 and 506, and the position information generator 511 are controlled according to the setting (step S709). Then, the setting process ends.

If the information for making setting of the HMD 50 under the control of the external apparatus is not included, the presence of the combining function, the presence of the distortion correction function, the type of the distortion correction function, the presence of the a position information generation function, and the type of the position information generation function of the external apparatus are confirmed, and a selectable setting from among the settings of the HMD 50 is determined (step S706).

The term selectable setting means a setting in which, for example, distortion correction or image combining is not redundantly performed by the external apparatus and the HMD 50. It is preferable that such a setting be determined from among the settings for the HMD in step S706. However, the standard for determining a selectable setting can be specified by the user, and the selectable setting is not limited to that described above.

Then, it is determined whether or not the number of selectable settings is one (step S707). If the number of selectable settings is one, the one selectable setting is made in the HMD 50 (step S708). Then, the functions of the image combining unit 504, the distortion correctors 505 and 506, and the position information generator 511 are controlled according to the setting (step S709), and the process ends.

If it is determined in step S707 that the number of selectable settings is not one, the user is notified of the selectable settings (step S710), and one of the selectable settings is selected according to an instruction from the user (step S711). The selected setting is made in the HMD 50 (step S708), and the functions of the image combining unit 504, the distortion correctors 505 and 506, and the position information generator 511 are controlled according to the setting (step S709). Then, the setting process ends.

If it is determined in step S701 that no external apparatus has been connected or if it is determined in step S703 that the setting information for the external apparatus has not been successfully read, one setting is selected from among all the settings of the HMD 50 in the manner described above (step S711).

The selected setting is made in the HMD 50 (step S708), and the functions of the image combining unit 504, the distortion correctors 505 and 506, and the position information generator 511 are controlled according to the setting (step S709). Then, the setting process ends.

Accordingly, since the HMD has a plurality of settings, the following advantages are achieved. A desired displayed image corrected for the image-capture distortion and the display distortion can be provided to the HMD user regardless of the presence of the combining function, distortion correction function, and position information generation function of the external apparatus connected to the HMD, and the type of the distortion correction function of the external apparatus.

Sixth Embodiment

A sixth embodiment of the present invention will now be described with reference to the drawings.

Figure 8:
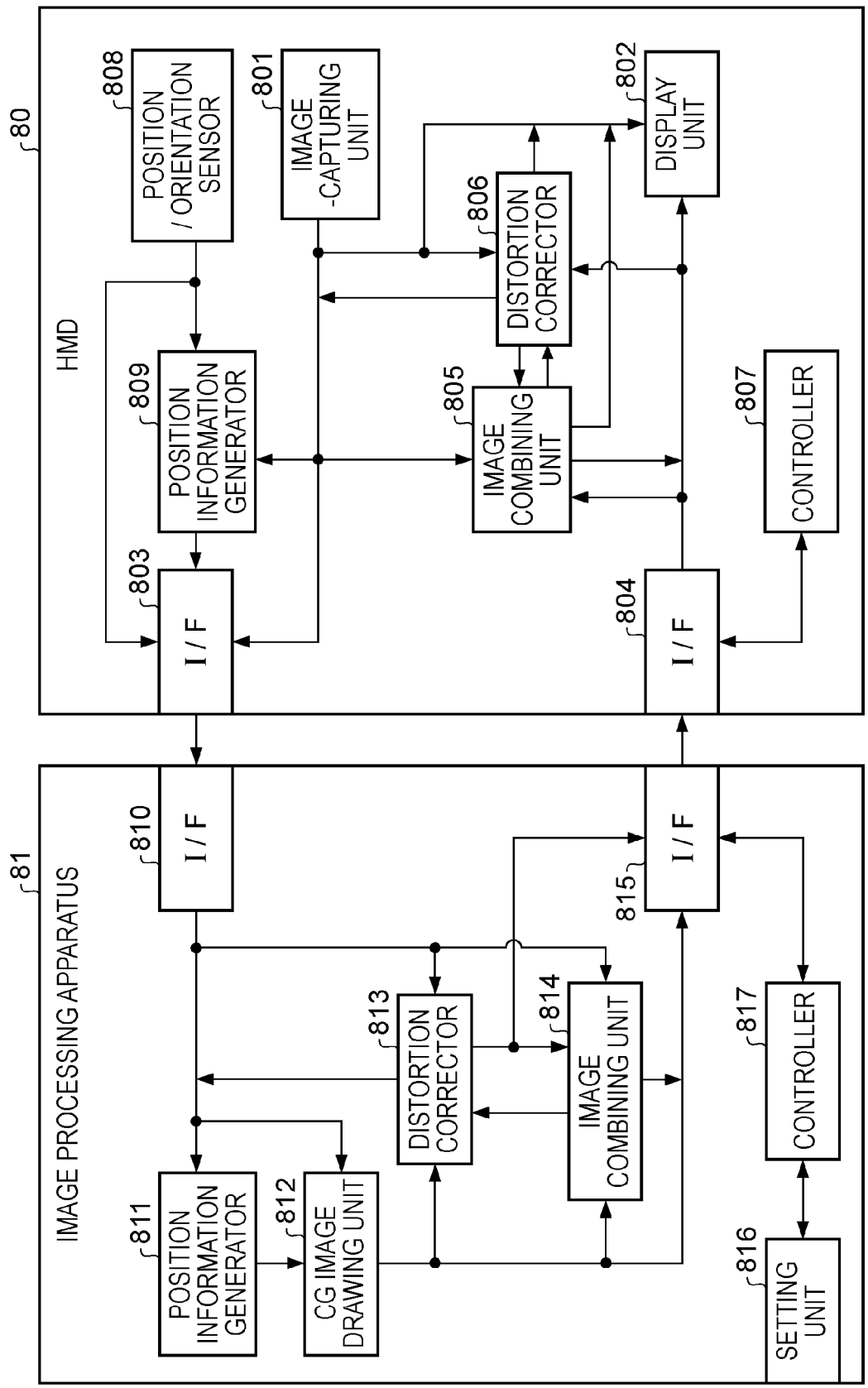
FIG. 8 is a schematic block diagram of an image display system according to a sixth embodiment of the present invention.

FIG. 8 is a functional block diagram of an image display system according to the sixth embodiment.

The image display system includes an HMD 80 and an image processing apparatus 81.

The HMD 80 includes an image-capturing unit 801, a display unit 802, I/Fs 803 and 804, an image combining unit 805, a distortion corrector 806, a controller 807, a position/orientation sensor 808, and a position information generator 809.

The image processing apparatus 81 includes I/Fs 810 and 815, a position information generator 811, a CG image drawing unit 812, a distortion corrector 813, an image combining unit 814, a setting unit 816, and a controller 817.

The CG image drawing unit 812 of the image processing apparatus 81 draws a CG image to be combined with a captured image on the basis of three-dimensional position and orientation information generated by the position information generator 809 of the HMD 80 or the position information generator 811 of the image processing apparatus 81. The functions of the other blocks are similar to those of the fifth embodiment. That is, the HMD 80 and the image processing apparatus 81 are configured such that the image combining unit 805, the distortion corrector 806, and the position information generator 809 of the HMD 80, and the image combining unit 814, the distortion corrector 813, the position information generator 811, and the CG image drawing unit 812 of the image processing apparatus 81 are controlled by the controllers 807 and 817, respectively, according to the setting input by the setting unit 816. Those functions can be used in combination to achieve various functions described below.

While in the sixth embodiment, the image processing apparatus 81 is provided with the setting unit 816, the HMD 80 may be provided with a setting unit configured to transmit setting information to the controller 817 of the image processing apparatus 81 via the controller 807 and the I/F 804 of the HMD 80 and the I/F 815 of the image processing apparatus 81. Alternatively, the HMD 80 or the image processing apparatus 81 may be provided with a setting I/F through which setting is made from an external apparatus.

FIG. 9 is a table showing settings that can be made in the image display system according to the sixth embodiment.

In the table, the notation "captured" indicates that the captured image is subjected to correction defined in the distortion-correction column. The notation "CG" indicates that the CG image is subjected to correction defined in the distortion-correction field, and the notation "combined" indicates that the combined image is subjected to correction defined in the distortion-correction field.

In the table, the column with the heading "combining" indicates whether the image combining unit 805 of the HMD 80 or the image combining unit 814 of the image processing apparatus 81 is to perform image combining. Settings whose combining column is set to "not applicable" indicate the type in which the image captured using the image-capturing unit 801 of the HMD 80 is not sent to the image processing apparatus 81 or is not combined within the HMD 80 but the captured image is displayed on the display unit 802.

The operations in the settings shown in FIG. 9 will be described with reference to the functional block diagram shown in FIG. 8.

Settings 1 through 4 indicate the type in which the image captured using the image-capturing unit 801 of the HMD 80 is displayed on the display unit 802 without being subjected to image combining.

In setting 1, the distortion corrector 806 performs distortion correction processing on the captured image captured using the image-capturing unit 801 to correct the image-capture distortion and the display distortion at the same time, and the corrected image is displayed on the display unit 802.

In setting 2, the distortion corrector 806 corrects the image-capture distortion of the captured image. In setting 3, the distortion corrector 806 corrects the display distortion of the captured image. In setting 4, the captured image is displayed on the display unit 502 without being subjected to distortion correction processing.

Settings 2, 3, and 4 may be used when the HMD 80 has either image-capture distortion or display distortion or does not have image-capture distortion or display distortion. Settings 2, 3, and 4 can also be intentionally used when the user does not desire distortion correction.

Settings 5 through 11 indicate the type in which the image captured using the image-capturing unit 801 of the HMD 80 and the CG image generated by the CG image drawing unit 812 of the image processing apparatus 81 are combined by the image combining unit 805 of the HMD 80, and the resulting combined image is displayed on the display unit 802.

Settings 5 and 6 in which both the image-capture distortion and the display distortion are corrected will now be described in detail.

In setting 5, the distortion corrector 813 of the image processing apparatus 81 performs image-capture inverse distortion correction on the CG image generated by the image processing apparatus 81, and transmits the corrected image to the HMD 80 via the I/Fs 815 and 804. Then, the image combining unit 805 of the HMD 80 combines the CG image with the captured image having image-capture distortion subjected to the image-capture inverse distortion correction. The distortion corrector 806 of the HMD 80 performs distortion correction processing on the resulting combined image to correct the image-capture distortion and the display distortion at the same time, and the corrected image is displayed on the display unit 802.

In setting 6, the distortion corrector 806 of the HMD 80 performs distortion correction processing on the captured image to correct the image-capture distortion and the display distortion at the same time, and the distortion corrector 813 of the image processing apparatus 81 performs display-distortion correction on the CG image. The image combining unit 805 of the HMD 80 combines those distortion-corrected images, and the resulting combined image is displayed on the display unit 802. In setting 6, both the captured image and the external input image are subjected to distortion correction once, resulting in a smaller arithmetic error than that in setting 5. Setting 6 is therefore more effective.

In settings 7 and 8, only the image-capture distortion is corrected. In settings 9 and 10, only the display distortion is corrected. In setting 11, no correction is applied for the image-capture distortion or the display distortion.

Settings 12 through 22 indicate the type in which the captured image and the CG image are combined within the image processing apparatus 81, and the resulting combined image is transmitted to the HMD 80 via the I/Fs 815 and 804 and is displayed on the display unit 802.

Settings 12 through 15 in which both the image-capture distortion and the display distortion are corrected will now be described in detail.

In setting 12, first, the distortion corrector 813 of the image processing apparatus 81 performs image-capture inverse distortion correction on the CG image generated by the image processing apparatus 81. Then, the image combining unit 814 of the image processing apparatus 81 combines the CG image with the captured image having image-capture distortion subjected to the image-capture inverse distortion correction. Then, the combined image is transmitted to the HMD 80 via the I/Fs 815 and 804, and the distortion corrector 806 of the HMD 80 performs distortion correction processing on the combined image to correct the image-capture distortion and the display distortion at the same time. The resulting image is displayed on the display unit 802.

In setting 13, the distortion corrector 806 of the HMD 80 performs distortion correction processing on the captured image to correct the image-capture distortion and the display distortion at the same time, and the distortion corrector 813 of the image processing apparatus 81 performs display-distortion correction on the CG image. The image combining unit 814 of the image processing apparatus 81 combines those distortion-corrected images, and transmits the combined the HMD 80 via the I/Fs 815 and 804. The transmitted image is displayed on the display unit 802. In setting 13, as in setting 6, both the captured image and the CG image are subjected to distortion correction once, resulting in a smaller arithmetic error than that in setting 12. Setting 13 is therefore more effective.

In setting 14, the distortion corrector 806 of the HMD 80 performs image-capture-distortion correction on the captured image captured using the image-capturing unit 801, and the captured image subjected to the image-capture-distortion correction is transmitted to the image processing apparatus 81 via the I/Fs 803 and 810. The image combining unit 814 of the image processing apparatus 81 combines the CG image generated by the CG image drawing unit 812 with the captured image subjected to the image-capture-distortion correction, and the distortion corrector 813 of the image processing apparatus 81 performs display-distortion correction on the combined image. The distortion-corrected combined image is transmitted to the HMD 80 via the I/Fs 815 and 804, and is displayed on the display unit 802.

In setting 15, the captured image captured using the image-capturing unit 801 is transmitted to the image processing apparatus 81 via the I/Fs 803 and 810, and the distortion corrector 813 of the image processing apparatus 81 corrects the image-capture distortion. The image combining unit 814 of the image processing apparatus 81 combines the CG image generated by the CG image drawing unit 812 with the captured image corrected for the image-capture distortion. The distortion-corrected combined image is transmitted to the HMD 80 via the I/Fs 815 and 804. The distortion corrector 806 of the HMD 80 performs display-distortion correction on the combined image, and the resulting image is displayed on the display unit 802.

In settings 16, 17, and 18, only the image-capture distortion is corrected. In settings 19, 20, and 21, only the display distortion is corrected. In setting 22, no correction is applied for the image-capture distortion or the display distortion.

Accordingly, a plurality of settings are provided. In the image display system having the HMD 80 and the image processing apparatus 81, therefore, an MR image corrected for the image-capture distortion and the display distortion can be provided to the HMD user by using the functions of the image combining units and the distortion correction functions in combination.

Seventh Embodiment

A seventh embodiment of the present invention will be described with reference to the drawings.

Figure 10:
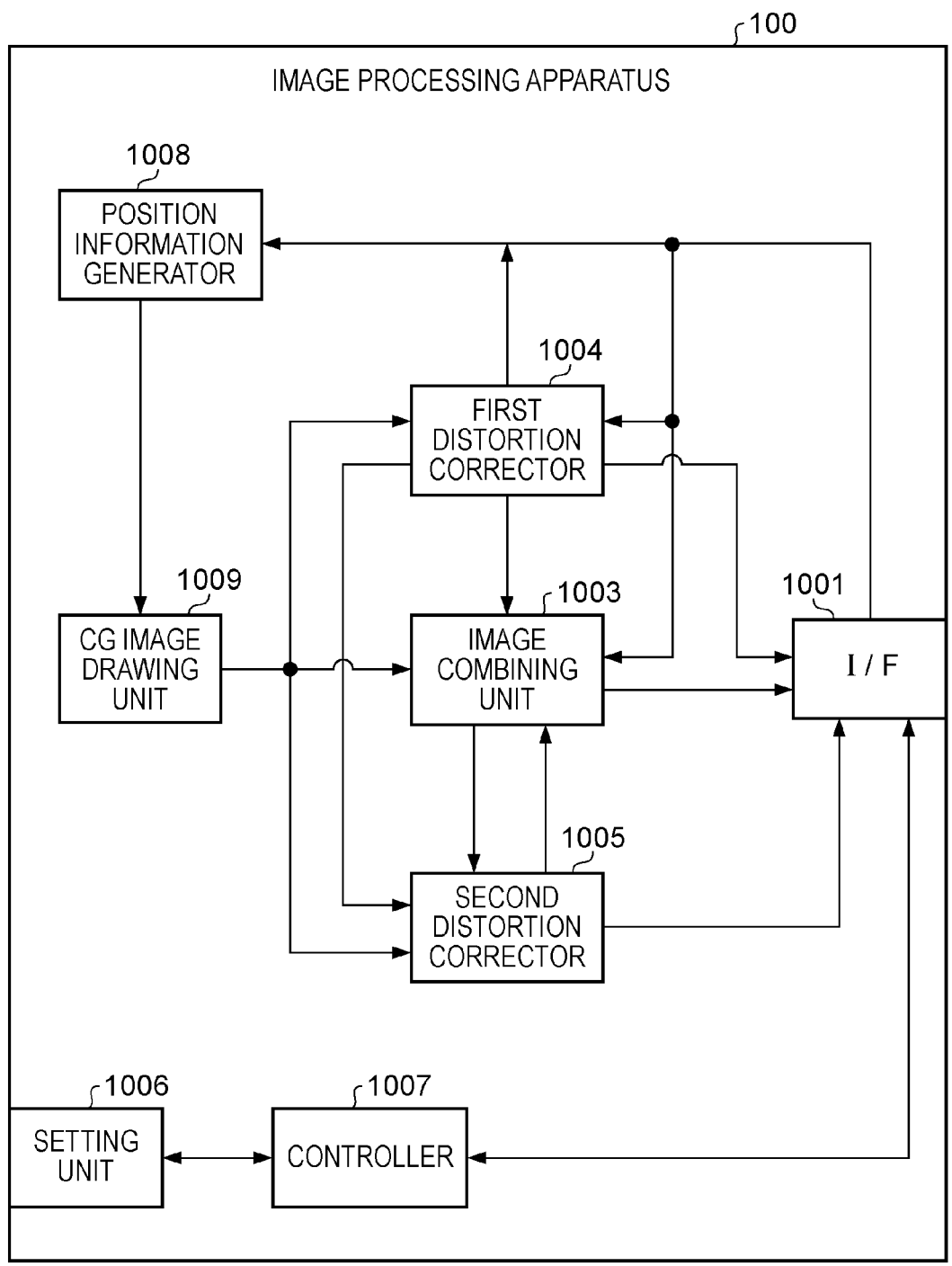
FIG. 10 is a schematic block diagram of an image processing apparatus according to a seventh embodiment of the present invention.

FIG. 10 is a functional block diagram of an image processing apparatus 100 according to the seventh embodiment.

The image processing apparatus 100 includes an I/F 1001, an image combining unit 1003, a first distortion corrector 1004, a second distortion corrector 1005, a setting unit 1006, a controller 1007, a position information generator 1008, and a CG image drawing unit 1009.

The functions of the respective blocks are similar to those in the fifth and sixth embodiments. That is, the image processing apparatus 100 is configured such that the image combining unit 1003, the first distortion corrector 1004, the second distortion corrector 1005, the position and orientation information generator 1008, and the CG image drawing unit 1009 are controlled by the controller 1007 according to the setting input by the setting unit 1006. Those functions can be used in combination to achieve various functions described below.

While in FIG. 10, the setting is performed by the setting unit 1006, an external apparatus connected to the image processing apparatus 100 can transmit setting information to the controller 1007 via the I/F 1001.

As shown in FIG. 10, the first distortion corrector 1004 and the second distortion corrector 1005 have different paths to the other functional blocks, and one of the first distortion corrector 1004 and the second distortion corrector 1005 can restrict the functions of the other. Alternatively, the paths to the other functional blocks may be equal to each other so that the first distortion corrector 1004 and the second distortion corrector 1005 can be utilized without distinction.

FIG. 11 is a table showing settings that can be made in the image processing apparatus 100 according to the seventh embodiment.

In the table, the notation "external" indicates that an external input image from an external apparatus connected to the image processing apparatus 100 is subjected to correction defined in the distortion-correction column. The notation "CG" indicates that the CG image generated by the CG image drawing unit 1009 is subjected to correction defined in the distortion-correction column, and the notation "combined" indicates that the combined image is subjected to correction defined in the distortion-correction column. In the table, the column with the heading "combining" indicates whether or not the image processing apparatus 100 is to perform image combining. Settings whose combining column is set to "not applicable" indicate that no image combining is performed. Settings whose combining column is set to "image processing apparatus" indicate the type in which an external input image input from the I/F 1001 is combined by the image processing apparatus 100, and the resulting combined image is output from the I/F 1001 to the external apparatus.

The operations in the settings shown in FIG. 11 will be described with reference to the functional block diagram shown in FIG. 10.

Settings 1 through 5 indicate the type in which the external input image input from the external apparatus is not subjected to image combining and the image is output to the external apparatus via the I/F 1001.

In setting 1, the first distortion corrector 1004 performs distortion correction processing on the image input from the external apparatus to correct the image-capture distortion and the display distortion at the same time, and the resulting image is output to the external apparatus via the I/F 1001.

In setting 2, the first distortion corrector 1004 performs image-capture-distortion correction on the external input image, and thereafter the second distortion corrector 1005 performs display-distortion correction. The distortion-corrected CG image is output to the external apparatus via the I/F 1001. The correction processes may be performed in reverse order.

In setting 3, the first distortion corrector 1004 performs image-capture-distortion correction on the external input image. In setting 4, the first distortion corrector 1004 performs display-distortion correction on the external input image.

In setting 5, the external input image is output to the external apparatus via the I/F 1001 without being subjected to distortion correction processing.

While in setting 1, the image-capture distortion and the display distortion are corrected at the same time by one iteration of the processing, setting 2 requires two iterations of the distortion correction processing. Therefore, setting 2 contains a larger arithmetic error than setting 1, and setting 1 is more effective.

Settings 3, 4, and 5 are used when the external apparatus connected to the image processing apparatus 100 has either image-capture distortion or display distortion or does not have image-capture distortion or display distortion.

In the foregoing description, setting 3 indicates the type in which an image input from the external apparatus is corrected for distortion, if necessary, and the resulting external input image is output again to the external apparatus via the I/F 1001. In practical use, however, the external input image may not be output to the external apparatus. This case will now be described.

The three-dimensional position and orientation information used by the CG image drawing unit 1009 to draw a CG image to be combined with the external input image can be generated by the position information generator 1008 using external input image data or sensing information obtained by various sensing devices.

In the case where three-dimensional position and orientation information is generated from the external input image data, the accuracy of the generated three-dimensional position and orientation information is low if the image includes image-capture distortion. In this case, the first distortion corrector 1004 corrects the external input image for the image-capture distortion, and the position information generator 1008 uses the image data corrected for the image-capture distortion. Therefore, higher-accuracy three-dimensional position and orientation information can be obtained.

In the image processing apparatus 100 according to the seventh embodiment, therefore, a setting in which the image-capture distortion of the external input image is corrected to generate high-accuracy three-dimensional position and orientation information and no image is output may be provided. A setting in which the image-capture distortion of the external input image is corrected to generate high-accuracy three-dimensional position and orientation information and a CG image drawn using the generated three-dimensional position and orientation information is subjected to distortion correction processing, as necessary, and is then output to the external apparatus may also be provided.

Settings 6 through 11 indicate the type in which the CG image generated by the CG image drawing unit 1009 is not combined within the image processing apparatus 100 and the image is output to the external apparatus via the I/F 1001.

In setting 6, the first distortion corrector 1004 performs distortion correction processing on the CG image generated by the CG image drawing unit 1009 to correct the image-capture distortion and the display distortion at the same time, and the resulting image is output to the external apparatus via the I/F 1001.

In setting 7, the first distortion corrector 1004 performs image-capture-distortion correction on the CG image, and thereafter the second distortion corrector 1005 performs display-distortion correction. The distortion-corrected CG image is output to the external apparatus via the I/F 1001. The correction processes may be performed in the reverse order.

In settings 8, 9, and 10, the first distortion corrector 1004 performs any of image-capture-distortion correction, display-distortion correction, and image-capture inverse distortion correction on the CG image, and the distortion-corrected CG image is output to the external apparatus via the I/F 1001.

In setting 11, the CG image is output to the external apparatus via the I/F 1001 without being subjected to distortion correction processing.

Settings 6 and 7 in which both the image-capture distortion and the display distortion are corrected are compared. In setting 6, as in setting 1, the image-capture distortion and the display distortion can be corrected at the same time by one iteration of the processing, resulting in a smaller arithmetic error than that in setting 7 that requires two iterations of the distortion correction processing. Therefore, setting 6 is more effective.

Settings 12 through 19 indicate the type in which the image combining unit 1003 in the image processing apparatus 100 combines the CG image generated by the CG image drawing unit 1009 with the external input image input from the external apparatus via the I/F 1001, and outputs the combined image to the external apparatus via the I/F 1001.

In settings 12, 13, and 14, both the image-capture distortion and the display distortion are corrected by the image processing apparatus 100.

In settings 15 and 16, only the image-capture distortion is corrected by the image processing apparatus 100.

In settings 17 and 18, only the display distortion is corrected by the image processing apparatus 100.

In setting 19, no correction is applied for the image-capture distortion or the display distortion.

Accordingly, since a plurality of settings are provided, the following advantages are achieved. An output image taking account of both correction for image-capture distortion and display-distortion can be generated regardless of the presence of the combining function, distortion correction function, and position information generation function of the external apparatus connected to the image processing apparatus 100, and the type of the distortion correction function of the external apparatus.

Other Embodiments

It is to be understood that the advantages of the present invention are achieved by providing a system or an apparatus with a storage medium storing program code of software implementing the functions of the embodiments described above so that a computer (or a central processing unit (CPU) or a micro-processing unit (MPU)) of the system or apparatus can read and execute the program code stored in the storage medium.

In this case, the functions of the embodiments described above are achieved by the program code read from the storage medium, and both the program code and the storage medium storing the program code constitute embodiments of the present invention.

Examples of the storage medium for supplying the program code may include a floppy disk, a hard disk, an optical disk, a magneto-optical disk, a compact disk read-only memory (CD-ROM), a compact disc readable (CD-R), a magnetic tape, a non-volatile memory card, and a ROM.

As well as achieving the functions of the embodiments described above by executing the program code read by the computer, an operating system (OS) or the like running on the computer may execute part of or the entirety of actual processing according to the instruction of the program code to achieve the functions of the embodiments described above. This also falls within the scope of the present invention.

Further, the program code read from the storage medium may be written to a memory of a function extension board placed in the computer or a function extension unit connected to the computer, and thereafter a CPU or the like of the function extension board or the function extension unit may execute part of or the entirety of actual processing according to the instruction of the program code to achieve the functions of the embodiments described above. This also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A display apparatus with an image-capturing function, comprising:
   an image-capturing unit;
   an outputting unit configured to output an image signal of an image captured using the image-capturing unit to an external apparatus;
   an inputting unit configured to input a combined image generated by an image combining unit configured to combine an external input image with an image captured using the image-capturing unit from the external apparatus;

a display unit;

a corrector configured to perform image-capture-distortion correction and display-distortion correction on an image signal captured by the image-capturing unit;

a controller configured to control the corrector to perform the image capture-distortion correction if a correction mode of the image capture-distortion is set, control the corrector to perform the display distortion correction if a correction mode of the display distortion is set, and control the corrector to perform the image capture-distortion correction and the display distortion correction at the same time if the correction mode of the image capture-distortion and the correction mode of the display-distortion are set; and a setting unit configured to set a type of distortion correction performed by the corrector and to determine whether or not the image combining unit is to perform image combining via an interface, wherein the controller performs the control according to the settings made by the setting unit, wherein the corrector performs the image-capture-distortion correction using a first correction table that contains image-capture-distortion correction data and performs the display-distortion correction using a second correction table that contains display-distortion correction data, and wherein when the image combining unit performs image combining to generate the combined image, the corrector performs image-capture inverse distortion correction on the external input image by applying distortion equal to image-capture distortion caused by the image-capturing unit, and the corrector performs image-capture-distortion correction and display-distortion correction on the combined image.

* * * * *